United States Patent
Wilson et al.

(10) Patent No.: US 10,327,021 B2
(45) Date of Patent: Jun. 18, 2019

(54) DISPLAY MANAGEMENT SERVER

(71) Applicant: Dolby Laboratories Licensing Corporation, San Francisco, CA (US)

(72) Inventors: William Brent Wilson, Belcarra (CA); Robin Atkins, San Jose, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 15/358,450

(22) Filed: Nov. 22, 2016

(65) Prior Publication Data
US 2017/0078724 A1 Mar. 16, 2017

Related U.S. Application Data

(63) Continuation of application No. 13/810,734, filed as application No. PCT/US2011/044616 on Jul. 20, 2011, now Pat. No. 9,509,935.
(Continued)

(51) Int. Cl.
*H04N 21/258* (2011.01)
*G06F 3/14* (2006.01)
(Continued)

(52) U.S. Cl.
CPC ..... *H04N 21/25825* (2013.01); *G06F 3/1423* (2013.01); *G06F 3/1462* (2013.01);
(Continued)

(58) Field of Classification Search
CPC ............... H04N 21/4402; H04N 21/84; H04N 21/23439; H04N 21/25825;
(Continued)

(56) References Cited

U.S. PATENT DOCUMENTS 5,600,574 A 2/1997 Reitan
7,508,452 B2 3/2009 Mori
(Continued)

FOREIGN PATENT DOCUMENTS

EP 0647910 4/1995
GB 2418091 3/2006
(Continued)

OTHER PUBLICATIONS

Alatan, A. et al. "Video Adaptation Based on Content Characteristics and Hardware Capabilities" 2007 2nd International Workshop on Semantic Media Adaptation and Personalization, Dec. 17-18, 2007, publisher: IEEE.
(Continued)

*Primary Examiner* — Pinkal R Chokshi

(57) ABSTRACT

A display management unit configured to provide a modified video signal for display on a target display over an electronic distribution network. The unit may access information regarding the target display and at least one input. The unit comprises a database interface configured to retrieve display characteristics corresponding to the information regarding the target display from a characteristics database, and a mapping unit configured to map at least one of tone and color values from the at least one input to corresponding mapped values based at least in part on the retrieved display characteristics to produce the modified video signal.

14 Claims, 9 Drawing Sheets

Related U.S. Application Data

(60) Provisional application No. 61/366,899, filed on Jul. 22, 2010.

(51) Int. Cl.

| | |
|---|---|
| *H04N 5/445* | (2011.01) |
| *H04N 21/2343* | (2011.01) |
| *H04N 21/236* | (2011.01) |
| *H04N 21/422* | (2011.01) |
| *H04N 21/431* | (2011.01) |
| *H04N 21/434* | (2011.01) |
| *H04N 21/84* | (2011.01) |
| *G09G 5/00* | (2006.01) |
| *G09G 5/04* | (2006.01) |
| *H04N 21/235* | (2011.01) |
| *H04N 21/61* | (2011.01) |
| *H04N 21/6336* | (2011.01) |
| *H04N 21/6379* | (2011.01) |
| *G09G 5/06* | (2006.01) |

(52) U.S. Cl.
CPC ............... *G09G 5/005* (2013.01); *G09G 5/04* (2013.01); *H04N 5/445* (2013.01); *H04N 21/2353* (2013.01); *H04N 21/23439* (2013.01); *H04N 21/23614* (2013.01); *H04N 21/234336* (2013.01); *H04N 21/42202* (2013.01); *H04N 21/4318* (2013.01); *H04N 21/4348* (2013.01); *H04N 21/6125* (2013.01); *H04N 21/6336* (2013.01); *H04N 21/6379* (2013.01); *H04N 21/84* (2013.01); *G09G 5/06* (2013.01); *G09G 2320/0242* (2013.01); *G09G 2320/0276* (2013.01); *G09G 2320/066* (2013.01); *G09G 2320/0626* (2013.01); *G09G 2320/0666* (2013.01); *G09G 2320/08* (2013.01); *G09G 2360/02* (2013.01); *G09G 2360/04* (2013.01); *G09G 2360/144* (2013.01); *G09G 2370/022* (2013.01); *G09G 2370/04* (2013.01)

(58) Field of Classification Search
CPC ..... G09G 2320/066; G09G 2320/0666; G09G 2320/02; G09G 2320/0276

See application file for complete search history.

(56) References Cited

U.S. PATENT DOCUMENTS

| | | | |
|---|---|---|---|
| 7,535,484 B2 | 5/2009 | Lessing | |
| 7,777,759 B2 | 8/2010 | Yoshida | |
| 8,281,350 B2 | 10/2012 | Ozawa | |
| 8,339,485 B2 | 12/2012 | Endo | |
| 8,538,197 B2 | 9/2013 | Kobayashi | |
| 2002/0027611 A1* | 3/2002 | Kondo | H04N 7/0125 348/458 |
| 2002/0097411 A1 | 7/2002 | Roche | |
| 2004/0012627 A1 | 1/2004 | Zakharia | |
| 2004/0117822 A1* | 6/2004 | Karaoguz | H04H 20/106 725/37 |
| 2004/0119814 A1 | 6/2004 | Clisham | |
| 2005/0104900 A1 | 5/2005 | Toyama | |
| 2005/0152597 A1* | 7/2005 | Spaulding | H04N 1/6058 382/162 |
| 2005/0160468 A1 | 7/2005 | Rodriguez | |
| 2005/0256940 A1* | 11/2005 | Henderson | G06F 17/30902 709/219 |
| 2005/0259113 A1 | 11/2005 | Endo | |
| 2006/0184638 A1 | 8/2006 | Chua | |
| 2007/0005795 A1 | 1/2007 | Gonzalez | |
| 2007/0053293 A1 | 3/2007 | McDonald | |
| 2007/0080975 A1* | 4/2007 | Yamashita | G09G 5/04 345/591 |
| 2007/0130626 A1 | 6/2007 | Kato | |
| 2007/0183656 A1 | 8/2007 | Kuwahara | |
| 2008/0068287 A1 | 3/2008 | Day | |
| 2008/0238931 A1* | 10/2008 | Komiya | H04N 5/58 345/589 |
| 2008/0256169 A1 | 10/2008 | Oehm | |
| 2008/0297451 A1 | 12/2008 | Marcu | |
| 2009/0119322 A1 | 5/2009 | Mills | |
| 2010/0007599 A1 | 1/2010 | Kerofsky | |
| 2010/0057782 A1 | 3/2010 | McGowan | |
| 2010/0058419 A1 | 3/2010 | Ozawa | |
| 2010/0135419 A1 | 6/2010 | Doser | |
| 2010/0265264 A1* | 10/2010 | Doser | G09G 5/02 345/590 |
| 2010/0281152 A1* | 11/2010 | Istavan | H04N 21/2355 709/223 |
| 2010/0289812 A1 | 11/2010 | Kobayashi | |
| 2011/0154426 A1* | 6/2011 | Doser | H04N 1/6088 725/118 |
| 2011/0164183 A1 | 7/2011 | Wada | |
| 2012/0014663 A1* | 1/2012 | Knight | G11B 27/034 386/240 |
| 2013/0038790 A1 | 2/2013 | Seetzen | |
| 2013/0088644 A1* | 4/2013 | Atkins | H04N 1/603 348/602 |
| 2013/0179934 A1 | 7/2013 | Bennett | |
| 2013/0343727 A1 | 12/2013 | Rav-Acha | |

FOREIGN PATENT DOCUMENTS

| | | |
|---|---|---|
| JP | 2007-318636 | 12/2007 |
| JP | 2010-108372 | 5/2010 |
| KR | 10-2005-0118567 | 12/2005 |
| KR | 10-2009-0122377 | 11/2009 |
| WO | 2002/097584 | 12/2002 |
| WO | 2008/085383 | 7/2008 |
| WO | 2009/002324 | 12/2008 |

OTHER PUBLICATIONS

Bouras, C. et al. "Streaming Multimedia Data with Adaptive QOS Characteristics" Characteristics, Protocols for Multimedia Systems 2000.

Sampsell, J. B. et al. "Video Processing for Flat Panel Displays" Sharp Labs of America, Image Processing, 1998 International Conference on Publication date: Oct. 4-7, 1998, vol. 1, pp. 5-7.

Tseng, B. et al. "Video Personalization and Summarization System for Usage Environment" IBM T.J Watson Research Center, 2004.

Wien, M. et al. "Real-Time System for Adaptive Video Streaming Based on SVC" IEEE Transactions on Circuits and Systems for Video Technology, vol. 17, No. 9, Sep. 2007.

\* cited by examiner

DISPLAY MANAGEMENT SERVER

CROSS-REFERENCE TO RELATED APPLICATIONS

This application is a continuation of U.S. patent application Ser. No. 13/810,734, filed Jan. 17, 2013, which is the United States national stage of International Patent Application No. PCT/US2011/044616, filed Jul. 20, 2011, which claims priority to U.S. Provisional Patent Application No. 61/366,899, filed Jul. 22, 2010, all of which are hereby incorporated by reference in their entirety.

TECHNICAL FIELD

The invention relates to the creation, processing, distribution and/or viewing of digital images, including video images. Embodiments provide functional units that perform one or more of tone mapping and gamut mapping. Some embodiments provide server-based functional units.

BACKGROUND

The creator of a video production typically controls tones and colors so that, when viewed, the video content has a desired appearance as guided by the creator's creative intent. For example, a creator may wish some scenes to have a darker, more oppressive, feel than others. This may include performing color grading (or 'color timing') on the source video data.

Various display technologies are now available. For example, there are CRT-based displays, plasma displays, displays backlit by a variety of types of light sources including LEDs of various types, fluorescent lamps, high-intensity incandescent lamps, digital cinema displays etc. A particular display combines display hardware with video signal processing components that receive video signals and drive the display hardware to display video content of the video signals.

Different displays may vary significantly with respect to features such as:
  the color gamut that can be reproduced by the display;
  the maximum brightness achievable;
  contrast ratio;
  resolution;
  acceptable input signal formats;
  color depth;
  white level;
  black level;
  white point;
  grey steps;
  etc.

Consequently, the same video content may appear different when played back on different displays. Video content displayed on some displays without modification may depart from the creator's creative intent in one or more ways.

Some current displays can outperform displays that were state-of-the-art at a time when certain video content was created. For example, the displays may be capable of providing images that have brighter highlights, greater contrast, and/or wider color gamuts than legacy displays that were originally available when the video production was created. It would be desirable to take advantage of these improved capabilities without departing significantly from the creative intent embodied in the video content.

It may be desirable to play video content created to take advantage of high-performance displays on legacy displays or displays that have lower capabilities. It would be desirable to provide methods and apparatus for adapting the way that the video is played to preserve as much as possible a creative intent embodied in the video content.

Different viewing environments may also cause video content to be perceived differently by viewers. For example, viewers may perceive the same video presentation presented on the same display differently depending on whether the display is being viewed in a dark room or in a brightly lit room. It would be desirable to adapt the playback of video content taking into account the environment in which the video content is being viewed to preserve as much as possible a creative intent embodied in the video content.

There remains a need for apparatus and methods which may be applied to adjust video signals such that the video content has a desired appearance when played.

SUMMARY

This invention has a number of aspects. One aspect provides functional units that take a video signal as input, and perform color mapping and/or tone mapping on the video signal to produce an output signal. The functional units may be provided upstream of an electronic distribution network through which video content is provided to displays or which the video content is to be viewed. The functional units may be under the control of the provider of video content. The functional units may receive various inputs as described herein and may be configured to vary their operation based upon the inputs. The functional units may be connected to a database to retrieve information used to vary their operation. Such functional units may be embedded in networked devices that handle video content such as video recorders, video editors, video processors, video servers, video content creation tools, mobile devices, video editing stations, and the like.

Such functional units may be implemented by hardware devices, programmable data processors executing software (or firmware), configurable hardware (such as FPGAs) and suitable combinations thereof. Software that, when executed, causes a data processor to implement a functional unit as described herein may be of a wide variety of types including operating system software, image rendering software, video player software, image creation software tools, video processing software, and others.

Another aspect provides tone and/or color mapping methods, units and apparatus that incorporate such units wherein mappings performed by the tone and/or color mapping units are determined at least in part by control signals that may be embedded in a video signal or otherwise associated with the video signal or by information retrieved from a database based on signals received from displays. In some embodiments, color and/or tone mappings are selected according to metadata embedded in, packaged with, or delivered in parallel with a video signal. In some embodiments, color and/or tone mappings are retrieved from a database indexed by display class. Some embodiments provide servers or other apparatus that may be connected to process video data en route to a display which embody such tone and/or color mapping units and methods. In some embodiments the control signals include data indicating reference ambient conditions and the color and/or tone mappings are selected and/or set based at least in part on differences between the reference ambient conditions and ambient conditions as measured by one or more ambient sensors. The ambient sensors may, for example, detect brightness and/or color of ambient light at the display.

Another aspect provides mapping for features of video signals (the features may include, for example, one or more tone and color coordinates). The mapping may be implemented by methods and apparatus which vary the mappings over time. The mappings may be varied to take into account one or more of: ambient conditions and the expected adaptation of the observers' human visual systems to light. In some embodiments, the rate of change of mappings is limited so as to avoid sudden changes that would be noticeable to observers. For example parameters which define a mapping may be varied smoothly over time.

In some embodiments, color mapping is based at least in part on a color of ambient light detected at a display or assumed to be present at the display. In some embodiments, color mapping is varied based on the brightness of ambient light at a display. In some embodiments, mappings of one or more features are controlled based on sensor measurements of ambient conditions (which may, for example, include one or more of brightness of ambient light, color of ambient light, brightness of ambient light in a number of different color bands etc.) as well as on metadata that specifies how the mapping ought to be set in response to the sensor measurements.

Another aspect provides a video processing apparatus that is connectable upstream from a video display and configured to receive an input video signal, and to compress and/or expand a gamut and/or tone of the input video signal to match capabilities of the display to yield an output video signal and to pass the output video signal downstream to the display. The video processing apparatus may include a communication interface for communicating with the display and receiving from the display data indicative of the capabilities of the display. A control system may set tone and gamut mapping to match the capabilities of the display. The control system may retrieve information for setting tone and gamut mapping from a database.

Another aspect provides mapping for features of video signals implemented by methods and apparatus which are configured to select and/or determine the mappings based at least in part on capabilities of a target display. The apparatus may determine capabilities of the target display, for example, based on user input, data relating to the target display (the data may be retrieved from or obtained from the target display itself, for example), inferred from behavior of the target display, or the like. In some embodiments selecting and/or determining mappings comprises an interpolation/extrapolation between two video signals representing the same video images. The interpolation/extrapolation may be based on capabilities of the target display relative to capabilities associated with the two video signals.

Further aspects of the invention and features of specific embodiments of the invention are described below and/or illustrated in the accompanying drawings.

BRIEF DESCRIPTION OF DRAWINGS

The accompanying drawings illustrate non-limiting example embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
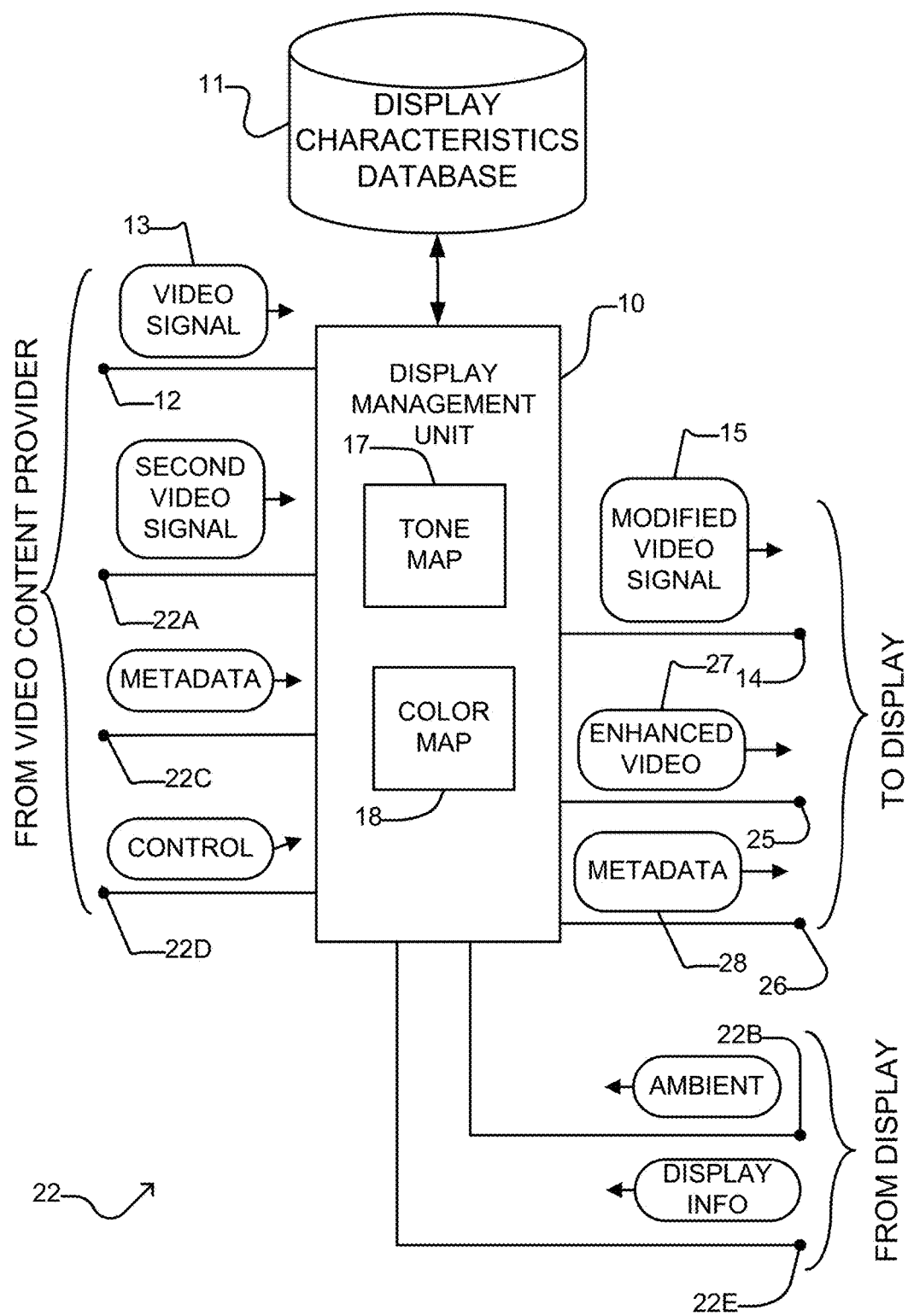
FIG. 1 is a block diagram illustrating some possible inputs for a display management unit.

FIG. 1 is a block diagram illustrating an example display management unit 10. Display management unit 10 has an input 12 for receiving a video signal 13 (typically in a digital format) and an output 14 for providing a modified video signal 15 to a display (not shown). Display management unit 10 may be located upstream of an electronic distribution network (such as, for example, the Internet, an Intranet, a wide area network (WAN), a local area network (LAN), or the like) which is used to distribute modified video signal 15 to the display. For example, in some embodiments, display management unit 10 may be implemented in a server.

Display management unit 10 generates modified video signal 15 by mapping tone and/or color of input video signal 13 according to a tone map 17 and a color map 18 respectively. In some embodiments, tone map 17 and color map 18 are combined and mapping of both color and tone may be performed using a single combined map. Mapping of color and tone may be performed simultaneously or in sequence.

In the FIG. 1 embodiment, display management unit 10 has one or more additional inputs 22A-22E (collectively, inputs 22) capable of receiving signals that may be used to control the mapping of tone and/or color in display management unit 10. Some embodiments may not include some of inputs 22.

The illustrated embodiment provides:
a second video signal input 22A for receiving a second video signal;
one or more ambient inputs 22B for receiving information from the display characterizing ambient conditions (e.g. one or more of brightness of ambient light, color of ambient light, direction of ambient light relative to the display) at a display where the video content will be viewed;
a metadata input 22C for receiving metadata characterizing one or more aspects of a creative intent that affect how the video content ought to be displayed (e.g., the subject-matter of the content embodied in a video signal, such as, for example, "sports", "movie", or the like);

a control input 22D for receiving control information for display management unit 10;

a display input 22E for receiving information from the display regarding the capabilities and/or current status of the display on which the video content is to be displayed.

Display management unit 10 controls the characteristics of tone map 17 and/or color map 18 based on signals received at one or more of inputs 12 and 22 and passes the resulting modified video signal 15 to output 14. Display management unit 10 also has a second optional video signal output 25 for carrying enhanced video information 27. Enhanced video information 27 may comprise, for example, information such as, high spatial frequency information, enhanced dynamic range information or the like, and a metadata output 26 for carrying metadata 28 relating to the video content being managed.

Inputs 12, 22A, 22C, and 22D may, for example, be provided by source video prepared by a colorist or other post-production video professional which aims to preserve the creative intent of the creator of the video content. Inputs 22B and 22E may, for example, be provided over the Internet from the display on which the content is to be displayed. Similarly, outputs 14, 25 and 26 may respectively send modified video signal 15, enhanced video signal 27 and metadata 28 to the display over the Internet. In some embodiments, ambient inputs 22B may be omitted, and adjustment of video data to account for ambient viewing conditions may be performed locally at the display on which the video content is to be displayed.

In some embodiments, display management unit 10 retrieves display characteristics from a display characteristics database 11 based on information received at display input 22E (such as, for example, a display class and/or individual display parameters) to control the characteristics of tone map 17 and/or color map 18. Display characteristics database 11 may, for example, store characteristics for each of a plurality of different classes of displays such as one or more color and tone maps for each class. For example, database 11 may store one or more color or tone maps for a "Rec. 709" class of displays configured to conform to ITU-R Recommendation BT.709, one or more "mobile" classes of displays configured to conform to one or more standardized mobile display formats, classes of displays configured to conform to other standardized display formats, and one or more "advanced" class of displays which have increased capabilities as compared to certain standardized formats. Advanced class displays may conform to standards such as DCI P3 (SMTE-431-2) and/or Adobe RGB, for example. Display characteristics database 11 may also store information for adjusting color and tone maps for a class of display based on individual display parameters for a particular display which describe how that display may vary from a typical display of the same class. Display characteristics database 11 may, for example, be indexed by display class and/or by individual display identifiers.

Display characteristics database 11 may be pre-populated with various individual display characteristics. Display characteristics database 11 may be populated with data from display manufacturers, distribution networks, third parties display data suppliers, users and/or the like. Display characteristics database 11 may be updated by display management unit 10 as new and/or updated display characteristics for individual displays become available.

The inputs and outputs of display management unit 10 are logically separate but are not necessarily physically separate. Two or more distinct input signals may be received at a single physical input or presented at a single physical output. For example, metadata may be embedded in a video signal such that a single physical input may serve as both input 12 and metadata input 20C. In such cases display management unit 10 comprises a suitable mechanism for separating different input signals that may be received at the same physical input.

One circumstance in which display management unit 10 may be used is the case where video content is to be displayed on a display capable of reproducing colors in a gamut that may be different from that of the video data presented at input 12 and/or having a dynamic range that may be different from that of the video data presented at input 12.

Figure 2A:
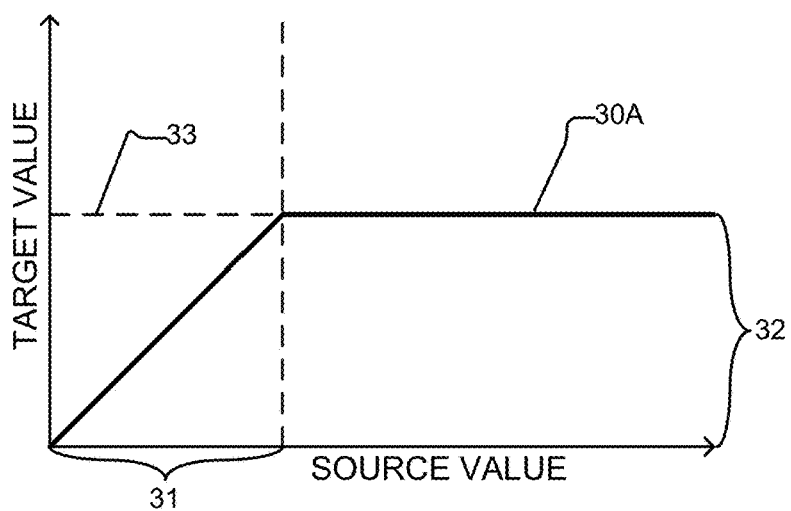
FIGS. 2A to 2F are graphs showing example gamut mapping and/or tone mapping curves for generating modified video data.
Figure 2B:
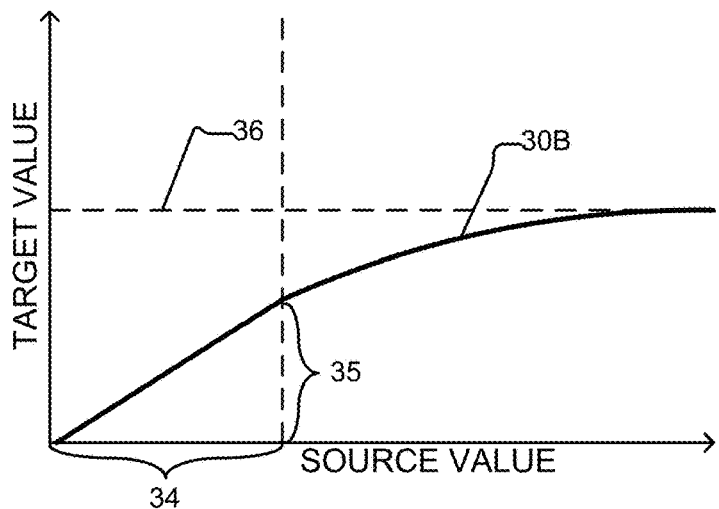
Figure 2C:
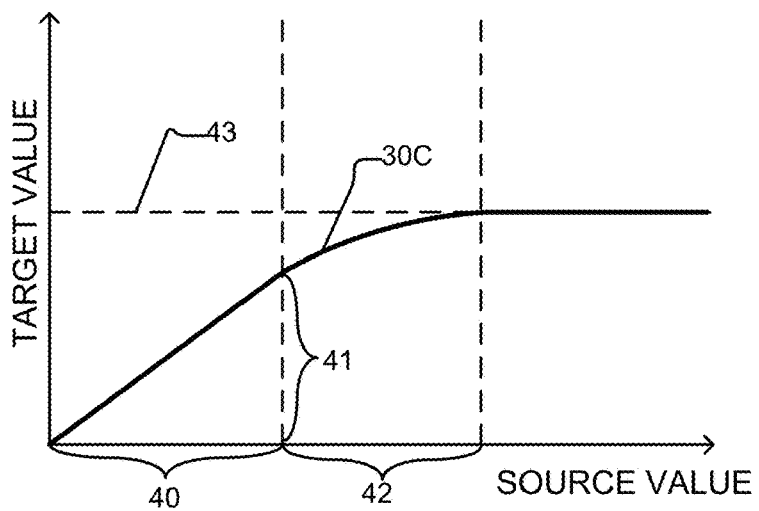

As one example, video data may be received at input 12 in a format that specifies color in a gamut broader than that of a target device such as a display and/or a dynamic range greater than that which the target device is capable of reproducing. FIGS. 2A, 2B and 2C are curves that illustrate three alternative ways to handle the mapping of parameters of a video signal. Such parameters may comprise, for example, parameters such as luminance, contrast, saturation, hue, tone, etc. The approaches illustrated in FIGS. 2A to 2C may be applied, for example to gamut mapping and/or tone mapping.

Curve 30A of FIG. 2A relates a source range of video parameters (such as, for example, luminance or gamut) in a video signal received at input 12 to a target range for a video signal presented at output 14. The axes in the graph of FIG. 2A, as well as in the graphs of FIGS. 2B-F, may be, for example linear or logarithmic. In the FIG. 2A example, a first range 31 of source values in the input signal is mapped to a second range 32 of target values of the output signal. The values may, for example, comprise values of a color attribute or luminance values. Any values in the input signal beyond first range 31 are clamped to the same value 33 in the output signal. Value 33 may, for example, be a maximum luminance of the display on which the video content is to be displayed. First range 31 and second range 32 may be equal. In some embodiments, source values in first range 31 are unaltered by the mapping.

For example, in a case where a target display is capable of reproducing luminances up to some maximum value, for example 600 cd/m$^2$, and the input signal contains luminance values exceeding that maximum value then values up to 600 cd/m$^2$ may be unaltered in mapping to the output signal while any values exceeding 600 cd/m$^2$ may be set to 600 cd/m$^2$ in mapping to the output signal. A mapping like that represented by curve 30A may be called a 'hard clipping' mapping. Hard clipping mappings may be applied to tone values, color values or both (as well as other parameters).

When hard clipping color values, the value of one channel (e.g., one of R, G or B) is out of range, the values of all channels may be scaled by the same ratio so that all channels are within range. In a linear RGB space, this approximately maintains the hue. In other color spaces different techniques may be used to preserve the color. For example, in an IPT space (in which color points are specified by hue, saturation and lightness values) the color may be hard clipped, for example, by clipping only the saturation value, while leaving the hue and lightness constant.

Curve 30B shown in FIG. 2B illustrates a soft compression embodiment. In this case, a first range 34 of values in the input signal is mapped to a second range 35 of values of the output signal. Any values in the input signal beyond first range 34 are compressed to values that are less than or equal to a maximum value 36 of the output signal.

Curve 30C shown in FIG. 2C illustrates a soft clipping embodiment. In this case, a first range 40 of values in the input signal is mapped to a second range 41 of values of the output signal. Ranges 40 and 41 may be the same. In some embodiments input values in range 41 are unaltered by the mapping. For a second range 42 of values in the input signal the output signal is compressed to values that less than or equal to the maximum value 43 of the output signal. Any values in the input signal beyond second range 42 are clamped to a maximum value 43 in the output signal.

The above examples show clipping and compression applied at the upper end of the input range. In other embodiments, clipping and/or compression may be applied at the lower end of the input range. Also, in some embodiments clipping and/or compression may be applied at both the upper and lower ends of the input range.

Mappings like those illustrated in FIGS. 2A through 2C may be implemented, for example, by providing a look up table. Color or luminance values for an output video signal may be obtained by using corresponding values for an input video signal as keys to search the look up table. A display management unit 10 may comprise one or more lookup tables for this purpose. In some embodiments, a plurality of lookup tables are provided for a plurality of image characteristics. For example, a display management unit 10 may comprise a luminance lookup table for looking up luminance values for an output video signal and one or more color lookup tables for looking up color values for the output signal. In other embodiments, mapping may be implemented by providing processing elements and/or logic elements configured to calculate output values from input values using a suitable mapping algorithm that takes input values as inputs and produces output values as outputs. Such a mapping algorithm may involve computing values for a function that includes a mathematical specification of a mapping curve. Some other non-limiting example mapping algorithms are discussed below.

Figure 2D:
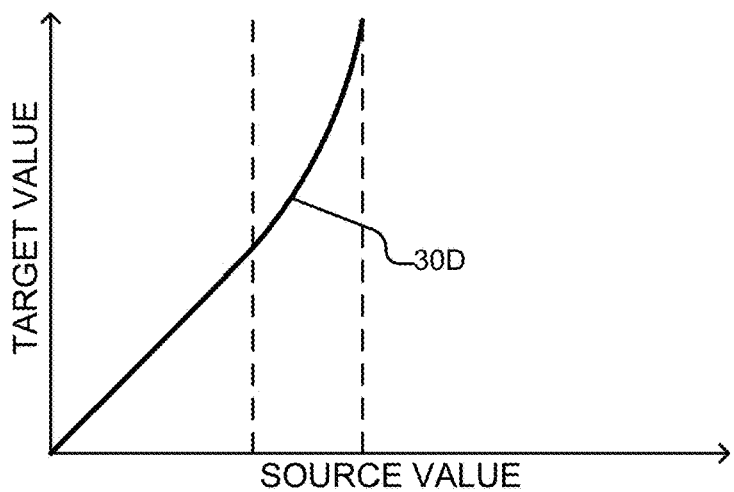
Figure 2E:
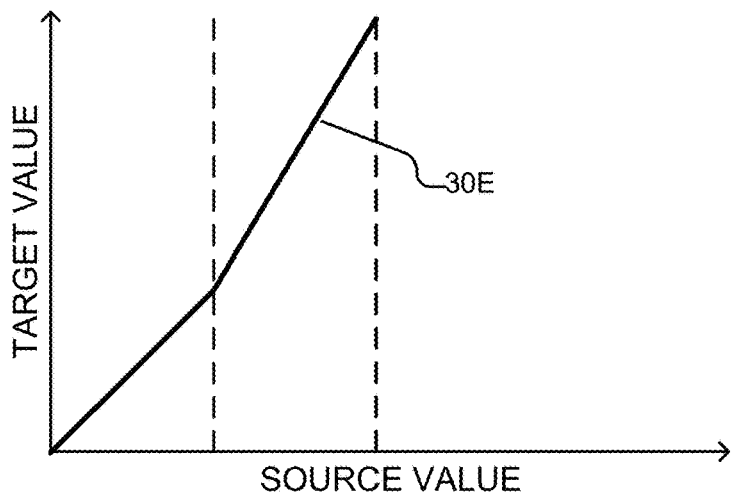
Figure 2F:
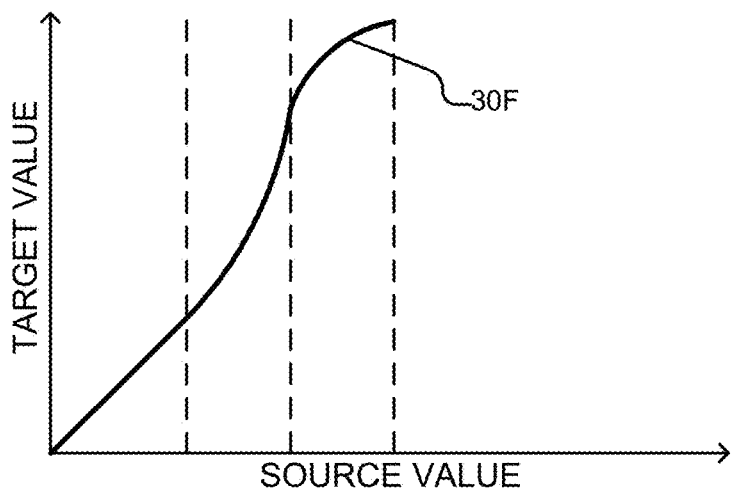

Static mappings may also be used in cases where video data is received at input 12 in a format that specifies color in a gamut narrower than that of a display and/or a dynamic range smaller than that which the display is capable of reproducing. In such case, the lookup table(s) may provide output values having a larger range than the corresponding input values. In some cases the output values may be outside of a range of values valid for the original video data. FIGS. 2D, 2E and 2F show example curves 30D, 30E and 30F. As one skilled in the art will appreciate, the curves shown FIGS. 2A-2F are for exemplary purposes only, and any of a variety of known mapping curves could also be applied. Actual mapping curves may be configured to avoid sharp corners in some embodiments.

Each of mapping curves 30A through 30F may be characterized by one or more parameters. For example, curve 30A may be characterized by a parameter P1 which both indicates the value to which the output signal is clipped and indicates the boundary between first and second ranges 31 and 32. Curve 30B may be characterized by parameters P2 and P3. P2 indicates the input value for which the output begins to be compressed and P3 indicates the maximum output value for the output signal. Additional parameters may control the form of the compression. In general, a mapping curve of almost any shape may be characterized by a sufficient number of parameters.

Apparatus according to embodiments of the invention may map according to any suitable mapping curves. In some embodiments it may be desirable to implement mapping curves of types that have been studied in the literature. One example of such curves is Reinhard's tone mapping curve.

Mappings between values in an input signal and corresponding values in an output signal may be performed by providing logic circuits and/or programmed processors configured to apply suitable algorithms to determine output values corresponding to input values. The operation of such algorithms may also be controlled by setting parameters.

In general, the translation of values from the input signal to corresponding values in the output signal may be represented by a function:

$$V_{OUT} = F(V_{IN}, P1, P2, \ldots, PN) \qquad (1)$$

Where $V_{OUT}$ is an output value, $V_{IN}$ is the corresponding input value, and P1 to PN are parameters of the function F. Different functions may have different numbers of parameters.

Some embodiments provide fixed display management units which adjust incoming video data in a manner that is independent of the image content of the video data. Some embodiments are configurable to operate in one of a number of different modes. For example, some embodiments may be configured to perform mappings like those illustrated in a selected one of two or more of FIGS. 2A to 2F, or other mappings. In such embodiments, the mapping may be changed in response to factors such as user inputs, changes in ambient conditions, metadata or other control information or the like.

Figure 3:
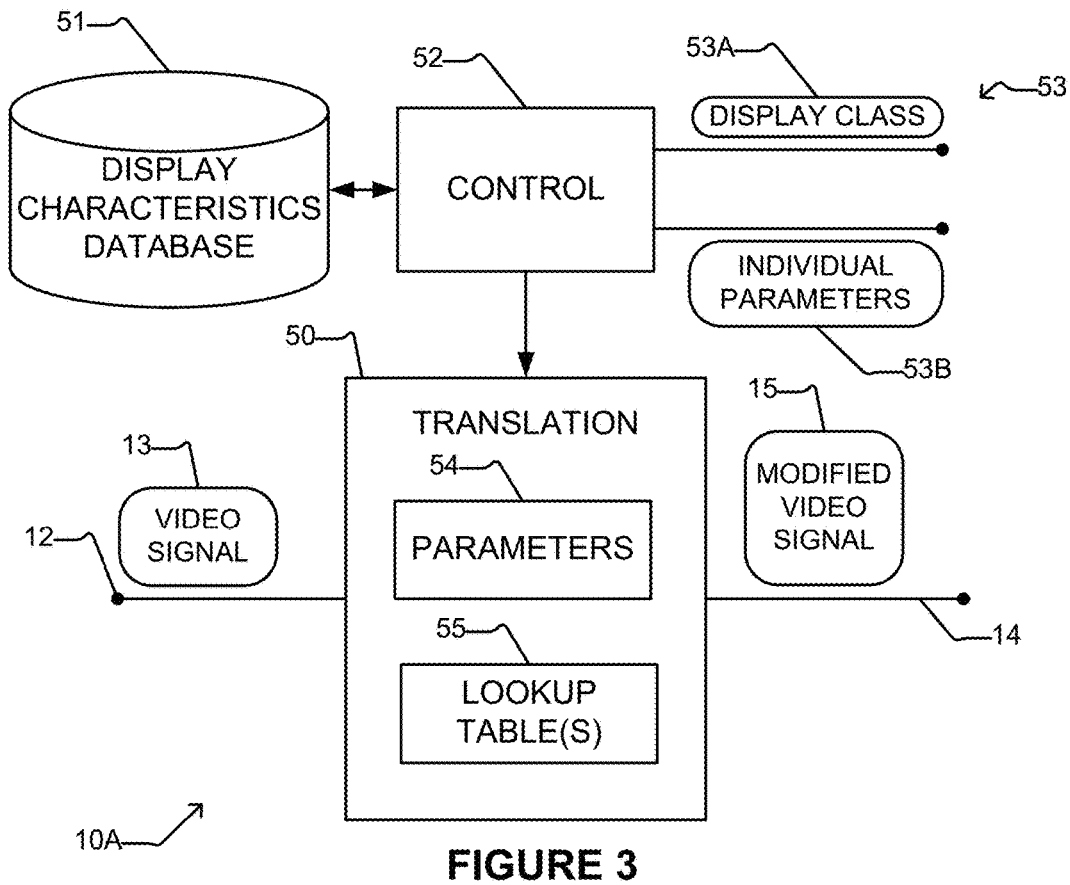
FIG. 3 is a block diagram illustrating an example display management unit.

FIG. 3 shows a display management unit 10A having an example architecture. Display management unit 10A comprises a translation block 50 and a control block 52. Translation block 50 operates to generate an output signal 15 at output 14. The manner of performing the conversion (e.g. the choice of F) and the parameters (e.g. values for P1 to PN) are determined by control block 52. Control block 52 may provide control over the operation of translation block 50, for example, by setting values for parameters 54, preparing lookup tables 55 for use by translation block 50, or the like.

Control block 52 attempts to optimize the translation provided by translation block 50 for the destination of modified video signal 15. To achieve this, control block 52 may compare explicitly communicated and/or assumed characteristics of the video content of the input video signal to explicitly communicated and/or assumed characteristics of the destination of modified video signal 15. In some embodiments, characteristics of the video content are explicitly communicated by metadata, either transmitted alongside the video signal or included with the video signal. In some embodiments, characteristics of the destination (such as display capabilities and viewing environment) are communicated by display parameters provided to data management unit 10A. In some embodiments, assumed characteristics may be preprogrammed into a memory of display management unit 10A, may be obtained through calibration of display management unit 10A, or may be specified by a user input. In some embodiments, the characteristics are luminance range supported. In some embodiments the characteristics are color gamut supported.

In some embodiments, control block 52 may be in communication with a display characteristics database 51 which stores characteristics such as, for example, information relating to parameters 54 and/or lookup tables 55 for a plurality of different classes of display. Database 51 may also store information for adjusting or generating parameters

54 and/or lookup tables 55 for a class of display based on individual display parameters such as, for example, capabilities or viewing environments. In such embodiments, control block 52 receives a display class 53A, and optionally individual parameters 53B from the display (or from another device such as a set-top box or the like coupled to the display), and queries database 51 to retrieve corresponding information for creating or modifying parameters 54 and/or lookup tables 55. For example, control block 52 may receive information from a display indicating that the display belongs to a "Rec. 709" class of displays, and retrieve from database 51 corresponding parameters 54 and/or lookup tables 55 such that transformation block 50 generates an output signal suitable for a Rec. 709 display. Control block 52 may also receive information from the display indicating local deviations from standard Rec. 709 display characteristics, and retrieve corresponding information from database 51 for suitably modifying the operation of transformation block 50. Local deviations from standard display characteristics may include, for example, ambient level, black level, white level, white point, color gamut primaries, chromaticities of color gamut primaries, and the like.

For example, control block 52 may determine that the destination device cannot fully reproduce one or more values from the input signal and, in response, select or create mappings for the values that are like mappings shown in one of FIGS. 2A, 2B or 2C. As another example, control block 52 may determine that the destination device has the ability to reproduce a wider gamut and/or a greater dynamic range than the device that the input signal was created for. In response, control block 52 may select or create mappings for the values that are like mappings shown in one of FIGS. 2D, 2E or 2F. Control block 52 may also set parameter values for the chosen mapping based upon the explicitly communicated, assumed and/or retrieved characteristics of the input video content and the destination device.

In some embodiments lookup table values or other parameters that define mappings are provided in metadata. In some embodiments, lookup table values or other parameters that define mappings are stored as entries in a database. A display management unit may be configured to retrieve the metadata or database entries and to set up a mapping based on the metadata or database entries. In some embodiments the metadata or database entries may provide alternative mappings for a range of applications and the display management unit may be configured to select certain mappings from the metadata or database entries and apply those mappings. For example, metadata or database entries may include definitions of mappings (which may consist of or comprise parameter values for mappings in some embodiments and may consist of or comprise fuller specifications of mapping curves in other embodiments) for:

- different ambient conditions that may be present at a destination device, such as different brightness levels, different colors of ambient light, or the like;
- different target devices;
- different types of media content (e.g. types of media content having different ranges of luminance and color);
- different portions of a video (e.g. different frames, different scenes or the like);
- and the like.

Control block 52 may control the initialization of translation block 50 to provide appropriate mapping(s) and, in some embodiments, may modify the mapping(s) over time or retrieve different mappings in response to signals received at display management unit 10A. In some embodiments, control block 52 changes mappings in real time in response to changing characteristics of the destination device (such as, for example, ambient viewing conditions) or changing characteristics of video content.

Figure 3A:
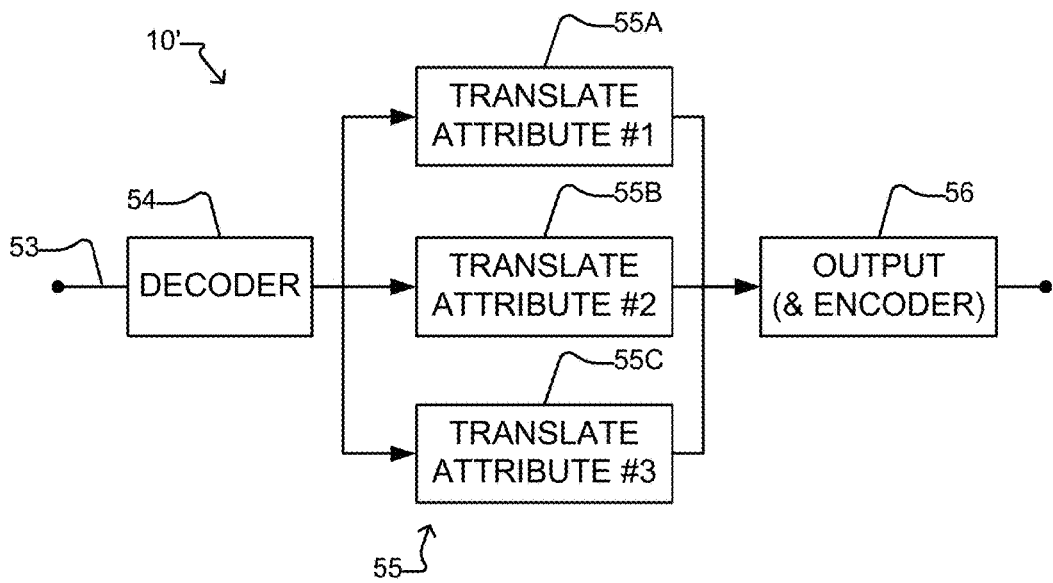
FIG. 3A is a block diagram illustrating another example display management unit.

FIG. 3A illustrates an alternative display management unit 10' which operates on a single input video signal in a fixed manner The video signal is received at input 53 and attribute values (for example, RGB values or LUV values or XYZ tristimulus values or IPT values etc.) are extracted by a decoder 54. Parallel translation mechanisms 55A, 55B and 55C (collectively, translation mechanisms 55) map values for a corresponding attribute to mapped values. Translation mechanisms 55 may, for example, comprise lookup tables, calculation logic and/or programmed processors that determine mapped values as a function of values from the incoming video data or the like. An output block 56 writes the mapped values into output video data. Output block 56 may also optionally encode the output video data for distribution over the Internet.

Returning to FIG. 1, display management unit 10 may provide an additional mode of operation for cases in which different video signals each carrying a different version of the same video content are received at inputs 12 and 22A. The two different versions may, for example, be individually optimized for displays having different color gamuts and/or dynamic range. If either version of the video signal has been optimized in a manner suitable for the destination device then that version may be passed to the destination device without alteration. In other cases, controller 52 may derive output signal 15 by interpolating between the two input video signals or extrapolating from the two input video signals. In cases where the two input video signals have each been optimized to preserve a creative intent (for example by suitable color timing), this mode has the advantage that the interpolated or extrapolated values may be expected to preserve that creative intent more closely than mappings based on one or the other version of input video.

Figure 4A:
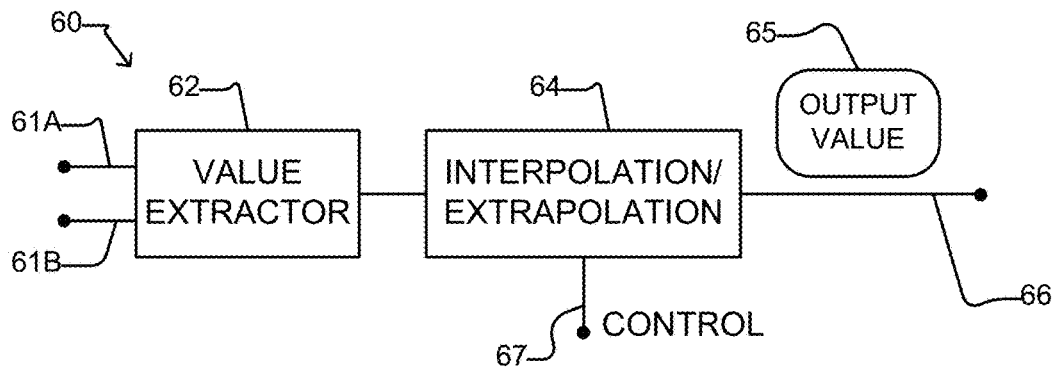
FIG. 4A is a block diagram illustrating the components of an apparatus for implementing mapping based on two or more input video signals.
Figure 4B:
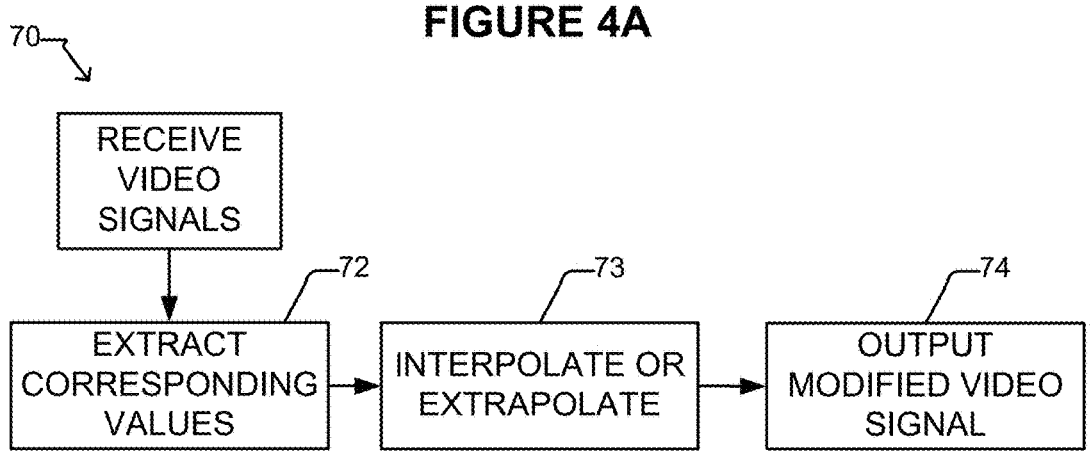
FIG. 4B is a flowchart illustrating an example method for mapping based on two or more input video signals.

FIG. 4A is a block diagram illustrating the components of apparatus 60 for implementing mapping based on two or more input video signals. FIG. 4B is a flowchart illustrating a method 70 for mapping based on two or more input video signals. Apparatus 60 comprises first and second inputs 61A and 61B which carry first and second video signals, respectively. A value extractor 62 is configured to extract corresponding values from the video signals (step 72 in FIG. 4B) and to pass the values to an interpolation/extrapolation block 64. In some embodiments the value extractor extracts pixel values from the video signals. The pixel values may, for example, comprise values of a tone and/or color coordinates in a color space. In some embodiments the color space is a perceptually linear color space.

Interpolation/extrapolation block 64 is configured to generate an output value 65 by interpolating or extrapolating (step 73) the extracted values and to provide the output value in a modified video signal (step 74) at an output 66. A control input 67 of interpolation/extrapolation block 64 receives a control value that controls the operation of interpolation/extrapolation block 64. Control values may be characteristic of the capabilities of and/or ambient conditions at a target device for which output video 65 is generated, for example. Control values may be derived from or embodied in information from the display, a display characteristics database, or the like. In a simple embodiment the control value is applied in interpolation/extrapolation block 64 to multiply a difference between the corresponding values in the first and second video signals in a calculation of a linear interpolation/extrapolation. The interpolation/extrapolation performed by block 64 may be based upon a value or values received at control input 67.

Figure 4C:
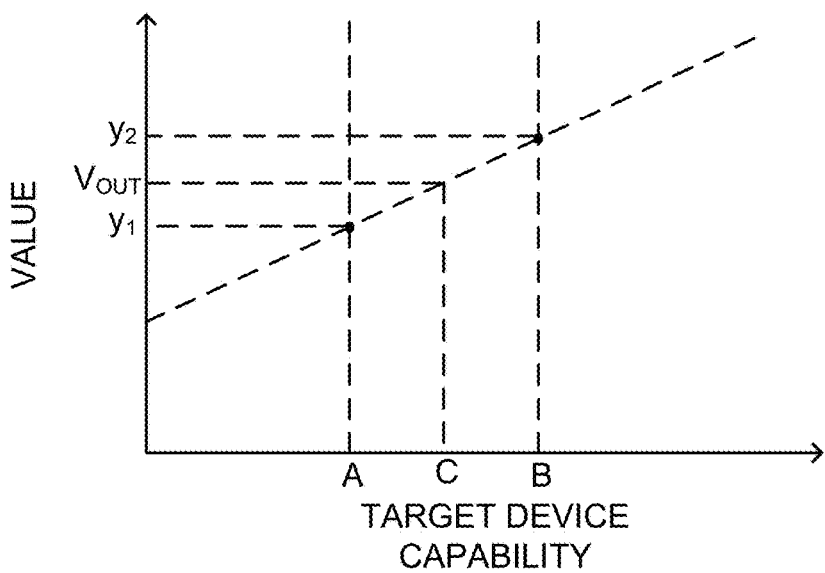
FIG. 4C is a graph illustrating a mode of interpolation/extrapolation from two input video signals.

FIG. 4C illustrates one way in which the interpolation/extrapolation may be performed. In FIG. 4C, a value in the first video signal is $y_1$ and the corresponding value in the second video signal is $y_2$. The horizontal axis in FIG. 4C indicates a target device capability. For example, the horizontal axis may indicate a dynamic range of a target device, or may indicate a logarithm of a luminance of a target device, according to some index, with the first video signal optimized for use with a target device having a capability A and the second video signal optimized for use with a target device having a capability B. If the target device for the video signal has the capability C then an output value may be determined, for example, according to:

$$V_{OUT} = y_1 + \left(\frac{y_2 - y_1}{B - A}\right)(C - A) \qquad (2)$$

(C−A) may be positive or negative. |C−A| may be greater or less than |B−A|.

A feature of Equation (2) is that $V_{OUT}$ is the same as $y_1$ and $y_2$ if $y_1=y_2$. Thus, if a creator has deliberately set $y_1$ and $y_2$ to be the same in the first and second video signals then embodiments which apply Equation (2), as well as other embodiments that share this feature, will preserve this value in the output video signal. On the other hand, where $y_1$ $y_2$ $V_{OUT}$ may be different from both of $y_1$ and $y_2$.

In some embodiments, the display management unit is configured to interpolate/extrapolate following perceptual curves. For example, the display management unit may be configured to interpolate/extrapolate on the logarithm of the luminance. In some embodiments, video data is converted into a perceptually uniform color space (such as, for example, IPT or LogYuv) before performing interpolation/extrapolation.

In some embodiments, interpolation between video data may be performed according to the following equations:

$$Y_{MDR} = e^{(\alpha \log(Y_{LDR}) + \beta \log(Y_{VDR}))} \qquad (3)$$

$$x_{MDR} = \alpha x_{LDR} + \beta x_{VDR} \qquad (4)$$

$$y_{MDR} = \alpha y_{LDR} + \beta y_{VDR} \qquad (5)$$

where: Y is a luminance coordinate in a color space such as LogYxy or LogY u'v'; the subscript VDR (as in $Y_{VDR}$, for example) identifies data from the video signal having the higher capability (e.g. higher dynamic range and/or broader color gamut); the subscript LDR identifies data from the video signal having the lower capability; the subscript MDR identifies the output or target video signal; α and β are interpolation constants; and x and y are color coordinates (for example, x and y in a LogYxy color space or u' and v' in a LogYu'v' color space). Here, α may be given, for example, by:

$$\alpha = \frac{\log(\max(Y_{VDR})) - \log(\max(Y_{TARGET}))}{\log(\max(Y_{VDR})) - \log(\max(Y_{LDR}))} \qquad (6)$$

where: max ($Y_{VDR}$) is the maximum value for Y that can be specified in the VDR (higher-capability) video signal, max $Y_{LDR}$ is the maximum value for Y that can be specified in the LDR (lower-capability) video signal, and max ($Y_{TARGET}$) is the maximum value for Y that can be reproduced on the target display. β may be given by β=1−α.

In some embodiments, the video signal having the lower capability comprises a Rec. 709 video signal. In some embodiments the video signal having the higher capability comprises color ranges sufficient to specify colors in a gamut that encompasses all colors perceptible by the human visual system.

In some embodiments, the display management unit is configured to determine whether the capability of a target device matches (either exactly or to within some threshold) the capability for which the first or second video signal is optimized. If so, it passes the matching one of the first and second video signals to the output without modification (or with a limited modification that addresses ambient conditions and/or estimated adaptation of viewers as described herein). Otherwise interpolation/extrapolation is performed as described above, for example.

Some embodiments provide fixed display management units which generate output video data based on interpolating/extrapolating from two or more sets of input video data in a manner that is independent of the image content of the video data. For example, the output video data may have attribute values that are a weighted combination of corresponding attribute values in the input video data. Weights may be determined at least in part based upon explicit and/or assumed differences between source parameters (e.g. gamut, dynamic range) and target parameters (e.g. gamut, dynamic range).

In some such embodiments the display management unit may have two or more operational modes. Input video data may be mapped to output video data differently in the different operational modes. In some cases the different operational modes may be selected automatically at least in part based upon target display capability (e.g., capability of the target display indicated by display characteristics retrieved from a display characteristic database or received from a target display). For example, in some embodiments, the display management unit is configured to receive display characteristics indicative of target display capability and to determine whether the target display capability defines an available valid gamut and also what is the relationship of the target display capability to the capability required to display the higher-quality input video data. In one example of such an embodiment:

If the target display capability is not provided or invalid, the display management unit passes through the lower-quality legacy video data (such as a Rec. 709 video stream). This ensures backwards compatibility.

If the target display is capable of displaying the higher-quality input video data then the display management unit may pass through the higher-quality video data unmodified. Alternatively, where the target display is more than capable of displaying the higher-quality input video data, the display management unit may extrapolate from the video data to take advantage of the full capabilities of the target device.

If the target display is incapable of displaying the higher-quality input video data then the display management unit may interpolate between the input video data as described above, for example.

In some embodiments, the display management unit is configured to selectively modify an incoming video signal. The selection may decide whether or not to modify values in the video signal or, in some embodiments, how to modify values in the video signal. Selection may result in some values being modified while other values of the same type (i.e. other values for the same attribute) are not modified or are modified in a different manner. Selection may be based on any or any combination of a number of criteria. For example:

Selection may be based on the magnitude of a value. For example, certain color or luminance values or ranges of values may be identified as values that ought not to be modified. A display management unit may be configured to apply one or more criteria to each value and to modify the value only if the value satisfies the one or more criteria. This type of selection may be applied, for example, to avoid modification of flesh tones, grass tones, sky tones or other tones which may be designated as "protected colors".

Selection may be based upon a location of a pixel with which values are associated. For example, certain areas of an image may be identified as selected areas for which values may be modified while other areas of the image may be identified as non-selected areas for which values ought not to be modified or ought to be modified differently. Modifications to pixel values may be made, or not, depending on whether the pixels lie within the selected areas or the non-selected areas. For example, a display management unit may receive information specifying the locations of light sources in an image (or may determine the location of light sources by analyzing the image). The display management unit may selectively modify luminance values for pixels in the immediate neighborhoods of the light sources while not altering luminance values for pixels located away from the light sources. The display management unit may modify luminance values for pixels in the immediate neighborhoods of the light sources in one manner while altering luminance values for pixels located away from the light sources in some other manner For example, luminance for pixels located in the immediate neighborhoods of light sources may be made relatively higher than luminance for pixels located away from light sources.

Selection may be based on an assessment of whether or not mapping of a value would likely result in a visible artefact or a difference that would stand out in an objectionable way when viewed by a viewer. In some embodiments, evaluation of whether or not to select a value for modification may be based on a computational model of the human visual system.

In some embodiments the display management unit is configured or configurable to operate in an adaptive mode in which one or more mappings are determined, at least in part, on the basis of image content in the incoming video signal(s). In an example of such an embodiment, a display management unit is configured to apply a mapping for one attribute based on values of one or more other attributes. For example, a luminance mapping for a pixel may be selected or determined in part based on color values for the pixel. For another example, a mean luminance of an image reproduced on a target display device over some time frame may be used to estimate the adaptation of the human visual system of a viewer and one or more mappings may be based in part on the estimated adaptation. In another example of such an embodiment, a display management unit is configured to apply a mapping for one attribute which is selected based on whether or not the pixel is identified as corresponding to a light source (for example by a local analysis of the image or by metadata identifying light source locations). In some embodiments, a display management unit varies a mapping continuously or stepwise such that the mapping can vary between a mapping as shown in FIG. 2A to a mapping as shown in FIG. 2C, for example.

In some embodiments, the mapping applied by a display management unit varies with time. For example, in some embodiments a display management unit receives inputs from sensors located at or near the display that monitor ambient conditions and provide ambient information to the display management unit, which in turn controls mapping of values from input to output video signals based at least in part on the ambient information. Ambient information may be used, for example, in determining mappings based on estimates of adaptation of the human visual systems of observers, estimates of the effective range of the display (e.g., black level) as affected by reflectance of ambient light from the screen, and the like.

Adaptation of the human visual system to ambient conditions may be estimated by the display management unit by modeling adaptation of the human visual system to ambient conditions. The modeled adaptation for a given point in time will, in general be a function of ambient information indicative of past ambient conditions. The modeled adaptation may take into account light emitted by a display receiving a video signal output by the display management unit instead of or as well as other ambient light at a viewing location. In some embodiments, ambient light may be estimated based on the video data in a video signal output by the display management unit. For example, adaptation of the human visual system may be modeled based on one or more of: the mean luminance of pixels in frames of video data over some interval and/or ambient lighting as measured by one or more sensors on a display or in the vicinity of the display. In some embodiments, adaptation of human visual systems is estimated based on an estimated average luminance of the display (which is a function of the displayed images). In other embodiments, adaptation of video data to ambient conditions may be performed locally, either by the display itself, or by a controller, set top box, or the like coupled to the display.

In some embodiments a luminance mapping is varied depending on an estimated level of dark-adaptation. For a high level of dark-adaptation, the mapping may be adjusted such that luminances are mapped to smaller values whereas for lower levels of dark adaptation the mapping may be adjusted such that luminances are mapped to higher values. A level of dark adaptation may be estimated, for example, by integrating an estimated light exposure over a characteristic adaptation period. The estimated light exposure may be determined, for example based on one or more of: a measure of the illumination provided by display of the video for example; the average or mean luminance of pixels in frames of video data; and ambient lighting as measured by one or more sensors located at or near the display.

Figure 5:
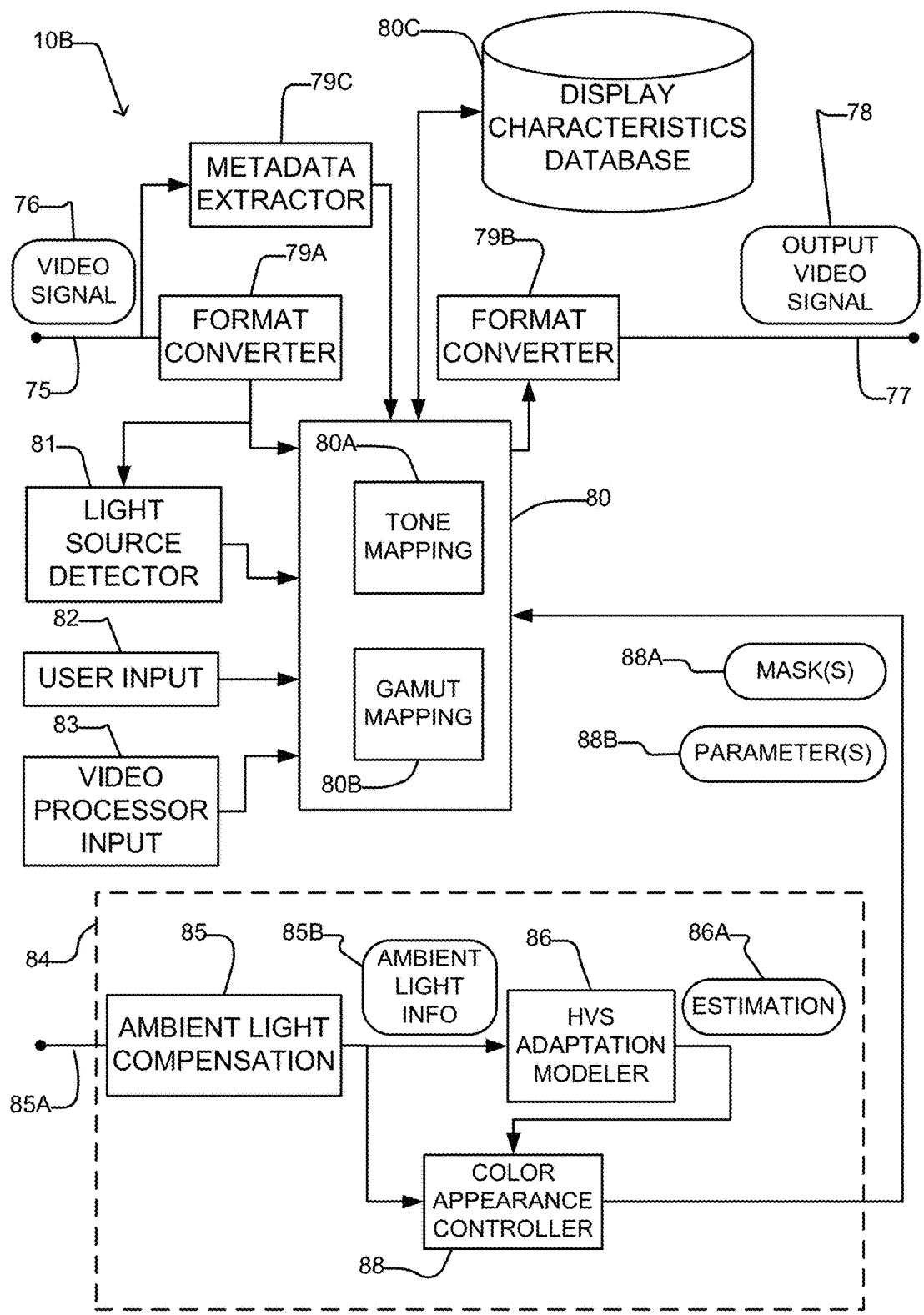
FIG. 5 is a block diagram illustrating functional blocks of an example display management unit.

FIG. 5 is a block diagram illustrating functional blocks of a display management unit 10B. Display management unit 10B represents pixel colors internally in a different format from the input and output video signals. Display management unit 10B has an input 75 that can carry a video signal 76 and an output 77 that can carry an output video signal 78.

In the illustrated embodiment, input and output video signals 76 and 78 have formats that represent colors as tristimulus values (XYZ) and display management unit 10B represents colors internally in an IPT color space. In some embodiments, input signal 76 is in a LogYu'v' format and output signal 78 is in a R'G'B' (gamma encoded RGB) format. In the IPT color space, I, P and T coordinates represent lightness, red-green channel and yellow-blue channel values. A format converter 79A converts input video signal 76 to the internal color space. A format converter 79B converts a processed video signal to the color space of output video signal 78. Format converter 79B may select the color space based at least in part on information stored in a display characteristics database 80C.

Display management unit 10B has a mapping unit 80. In the illustrated embodiment, mapping unit 80 comprises tone mapping unit 80A and gamut mapping unit 80B. Tone mapping and gamut mapping may be combined or implemented separately, as shown. Mapping values of different attributes of the input video signal may be performed sequentially or in parallel.

In some embodiments, display management unit 10B includes an optional metadata extractor 79C. Metadata extractor 79C extracts metadata included in input signal 76 and provides the extracted metadata to mapping unit 80.

Display management unit 10B has a light source detector 81. Light source detector 81 identifies light sources in images carried by the incoming video data and provides information about such light sources to mapping unit 80. Display management unit 10B may optionally or in the alternative receive information regarding the locations of light sources in metadata embedded in the incoming video signal 76, or receive such information from a separate source. In some embodiments, different mappings of one or more of tone and color are provided for pixels associated with light source locations than for pixels not associated with light source locations. In some embodiments, mappings are implemented by values in one or more look up tables and, for at least one mapping (e.g. for mapping luminance), separate lookup tables may be provided for use in mapping pixels associated with light source locations and for pixels not associated with light source locations.

Display management unit 10B may also optionally have a user input 82 and/or a video processor input 83, which may be used to respectively provide user control and/or video processor control of various aspects of the mappings performed by mapping unit 80. In some embodiments, mapping unit 80 uses a display class and/or individual display parameters received at video processor input 83 to retrieve corresponding information from display characteristics database 80C for use in controlling the mappings.

The mappings performed by mapping unit 80 may be controlled by an optional control block 84 in some embodiments. Control block 84 comprises an ambient light compensation block 85 that is connected to receive one or more inputs 85A from ambient light sensors located at or near the display and to output information 85B indicative of ambient light at a viewing area. Ambient light information 85B is provided to a human visual system (HVS) adaptation modeler 86 that provides as an output an estimation 86A of the sensitivity of the human visual system to light.

Estimation 86A and ambient light information 85B are provided to a color appearance controller 88. Color appearance controller 88 may comprise a fuzzy logic controller, a neural network, a programmable controller, hard-wired logic, configurable logic circuits or the like. In some embodiments, color appearance controller 88 may model how certain colors and/or tones are likely to be perceived by human viewers.

Color appearance controller 88 controls the operation of mapping unit 80 for example by changing fixed mappings, mapping functions, parameters affecting mappings and/or selecting values to be affected by mappings (for example, by providing values stored in look-up tables). In some embodiments, color appearance controller is configured to alter mappings by one or more of:

selecting one of a plurality of look-up tables to perform a mapping;
writing different values into a lookup table used to perform the mapping;
writing new parameter values to one or more registers or memory locations that specify selection of or behavior of a mapping algorithm implemented in hardware or software;
etc.

These are examples only.

In some embodiments, color appearance controller 88 outputs one or more masks 88A that define which pixels of an image are to be affected (or not affected) by mappings performed by mapping unit 80 and mapping control parameters 88B that control the mappings performed by mapping unit 80. In some embodiments, masks and/or control parameters may additionally or alternatively be specified by metadata.

In some embodiments, mappings are set according to a plurality of different inputs. for example:

an initial mapping may be performed and an output from the initial mapping may be subjected to further mapping by a mapping controlled by a color appearance controller; the initial mapping may be accomplished by a fixed mapping, interpolation/extrapolation between first and second video signals, a mapping controlled by metadata, a mapping determined in response to parameters specifying capabilities of a target device or the like;
a mapping may be controlled in response to multiple different inputs;
etc.

In some embodiments, color appearance controller 88 is configured to select mappings that result in increased contrast in cases where ambient light is relatively bright. In some embodiments, color appearance controller 88 is configured to select mappings to shift colors toward a color point of ambient light indicated by ambient light information 85B.

Figure 6:
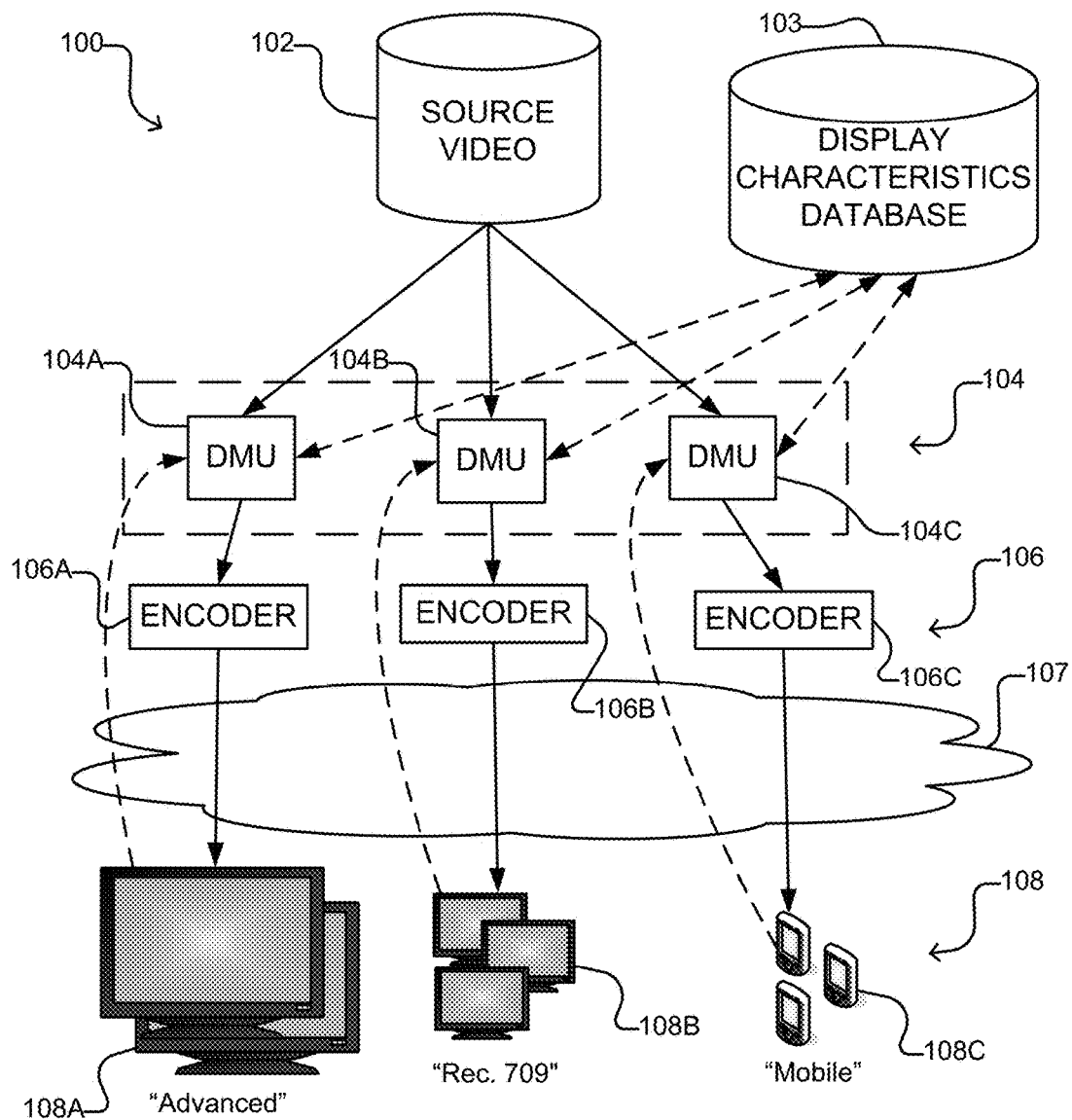
FIG. 6 is a block diagram illustrating a video pipeline in which display management units are applied upstream from a distribution network.

FIG. 6 shows a video pipeline 100 wherein source video 102 produced by a creator of video content is provided to one or more display management units 104. In the illustrated embodiment, display management unit(s) 104 distribute modified video signals through encoders 106 to displays 108 over an electronic distribution network 107. In other embodiments, encoding functionality is incorporated into display management unit(s) 104, and separate encoders are omitted. In some embodiments, displays 108 have embedded decoding functionality. In other embodiments, decoding of video signals sent over electronic distribution network 107 is provided by devices external to displays 108, such as, for example, set top boxes or the like.

Display management unit(s) 104 are configured to generate different modified video signals for a plurality of different types of display 108. In some embodiments, a different display management unit 104 is provided for each of a plurality of classes of displays 108. For example, in the FIG. 6 example, display management unit 104A provides video data optimized for an "Advanced" class of displays 108A through encoder 106A, display management unit 104B provides video data optimized for a "Rec. 709" class of displays 108B through encoder 106B, and display management unit 104C provides video data optimized for a "Mobile" class of displays 108C through encoder 106C. In other embodiments, a single display management unit 104 provides video data optimized for a plurality of different classes of displays, as indicated by the dashed box around display management units 104A-C in FIG. 6. Likewise, in some embodiments, a single encoder may encode video data for a plurality of different classes of displays. Display management unit(s) 104 may also provide video data optimized for additional and/or different classes than those shown in the FIG. 6 example.

Display management units 104 receive identifying information from displays 108, and use the identifying information to retrieve corresponding characteristics from a display characteristics database 103. Display characteristics database 103 may indexed by display class in some embodiments. In some embodiments, display management units 104 receive a display class from each display and retrieve corresponding class characteristics from database 103 for optimizing video data for that class of display.

In some embodiments, a display management unit 104 may also receive individual parameters from a display 108 and retrieve corresponding information from display characteristics database 103. In some embodiments, display management unit 104 uses the information for adjusting video data optimized for a general class of displays to better suit a display having those individual parameters. In some embodiments, display management unit 104 uses the information for sending supplemental data in addition to a modified video data optimized for a general class of display. In some embodiments the modified video data and the supplemental data may be combined to conform to a standard video data format. For example, in some embodiments, video data optimized for Rec. 709 displays may be combined with supplemental data for use by a display 108B which provides individual parameters to display management unit 104B and encoded by encoder 106B to conform to a standard Rec. 709 signal, such that the modified video data and supplemental data may be electronically distributed together by devices configured to handle standard Rec. 709 signals.

Figure 7:
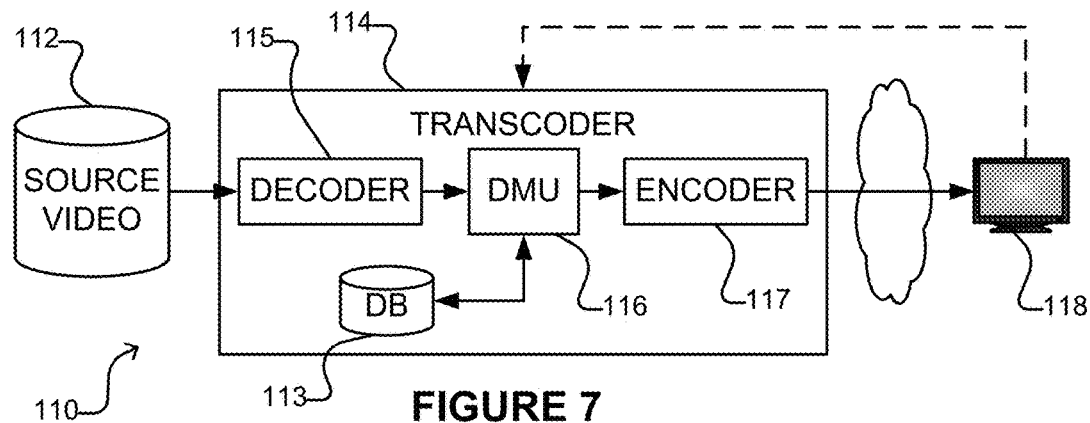
FIG. 7 is a block diagram illustrating an example transcoder which includes a display management unit.

FIG. 7 shows a video distribution system 110 wherein source video 112 which has been encoded is distributed through a transcoder 114 and over an electronic distribution network (not specifically enumerated) to a display 118. Transcoder 114 comprises a decoder 115 configured to receive encoded source video data and provide decoded source video data to a display management unit 116. Display management unit 116 generates modified video data and provides it to an encoder 117, which in turn encodes the modified video data for distribution to display 118 over the electronic distribution network. In some embodiments, display management unit 116 receives identifying information from display 118 and retrieves corresponding display characteristics from a display characteristics database 113 for use in generating the modified video data.

Figure 8:
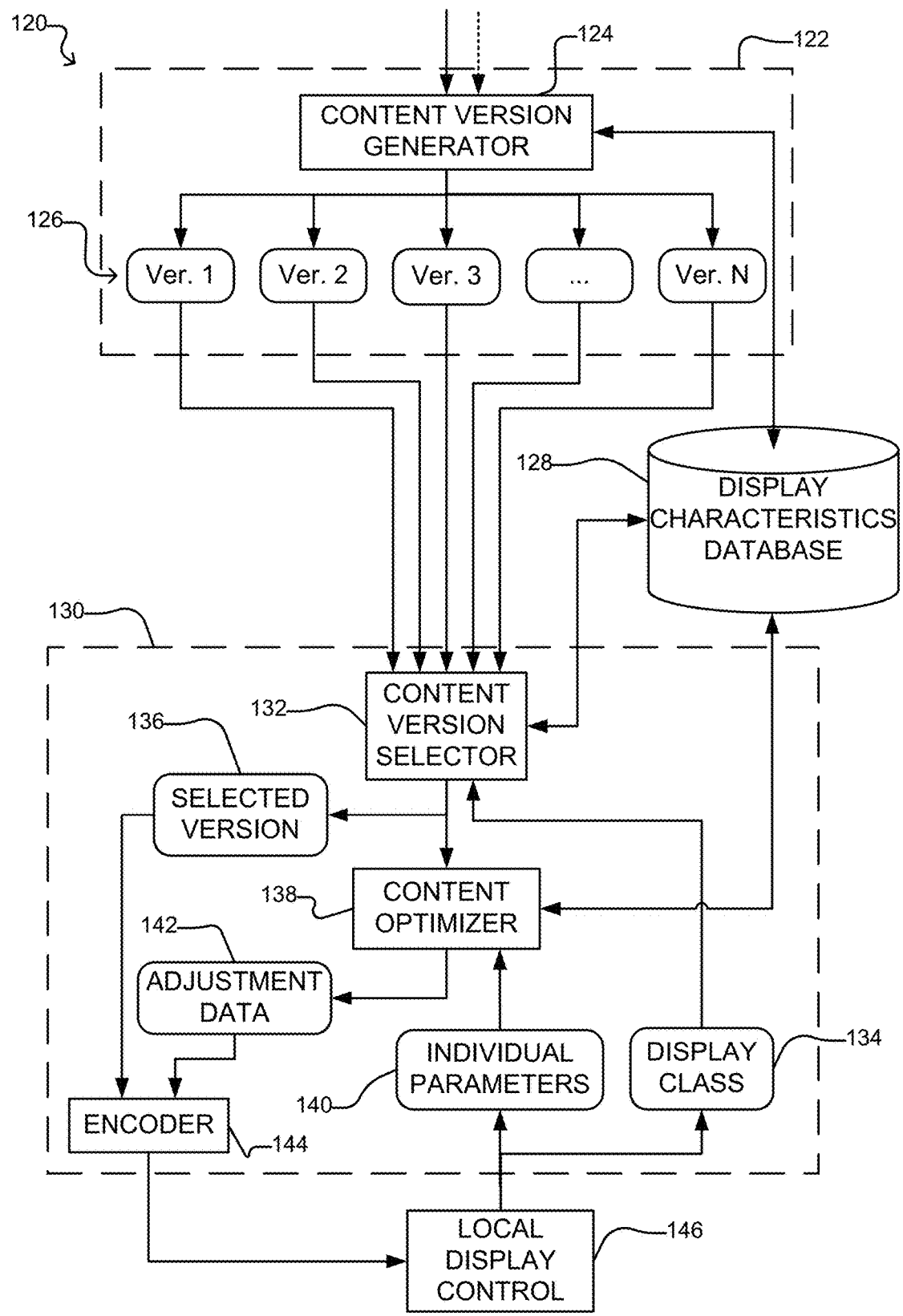
FIG. 8 is a block diagram of a server-based display management system in communication with a local display control.

FIG. 8 shows a server-based display management system 120 according to an example embodiment. In some embodiments, display management system 120 comprises an optional version creation block 122. Block 122 comprises a content version generator 124 which receives one or more input video signals from a video content provider and generates a plurality of versions 126 of video content. Each version 126 is configured to be provided to one of a plurality of different classes of display. In some embodiments, content version generator 124 may employ one or more tone and/or color maps such as those described above for each class of display to generate a version of the video content for that class. In some embodiments, content version generator may retrieve tone and color maps from a display characteristics database 128. In some embodiments, content version generator 124 receives two versions of video content from the video content provider and extrapolates/interpolates as described above based on the two received versions to generate a version for each class of display. In some embodiments, the video content provider may provide versions 126, and block 122 may be omitted.

Versions 126 are provided to a selection and optimization block 130. Block 130 comprises a content version selector 132 which receives a display class 134 from a local display control 146 and selects a corresponding selected version 136 from among versions 126 based on the received display class 134. In some embodiments, content version selector 132 may retrieve corresponding display characteristics from display characteristics database 128 based on the received display class 134.

A content optimizer 138 receives selected version 136 from content version selector 132. Content optimizer 138 may also receive individual parameters 140 for a display from local display control 146 which indicate how that display differs from a general class of display. When content optimizer 138 receives individual parameters 140, content optimizer 138 retrieves corresponding display characteristics from display characteristics database 128 for use in generating adjustment data 142. Selected version 136 and adjustment data 142 (if present) are provided to an encoder 144 which encodes selected version 136 and adjustment data 142 for distribution over an electronic distribution network to local display control 146. Adjustment data 142 may be used by local display control 146 to adjust selected version 136 for optimal playback on the particular display controlled by local display control 146.

Figure 9:
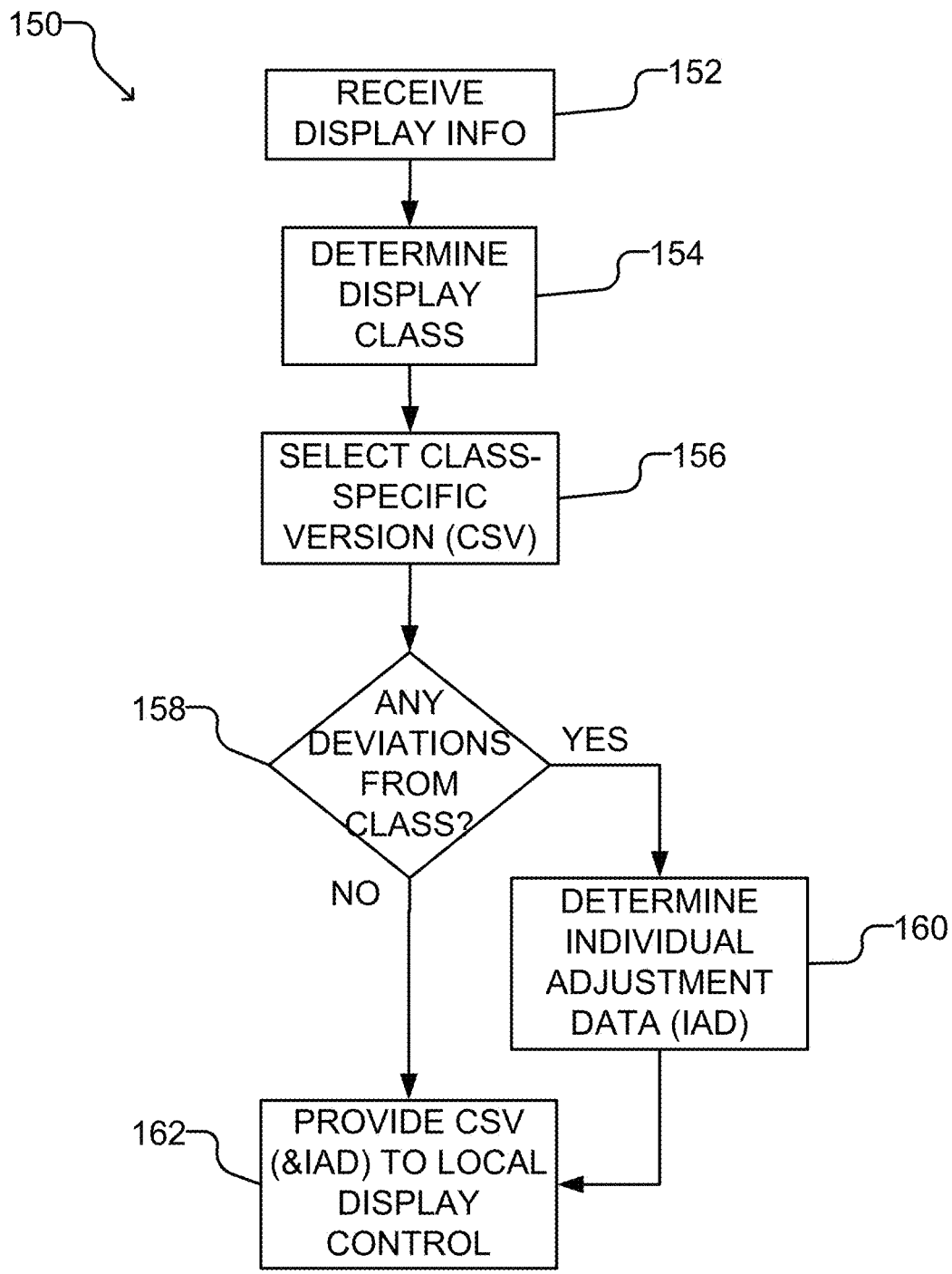
FIG. 9 is a flowchart illustrating an example method for providing video content from a display management server to a display.

FIG. 9 is a flowchart showing a method 150 of providing video content from a server-based display management system to a local display control which controls the operation of a display on which the video content is to be viewed. At step 152 the display management system receives display information. Display information may, for example, be received directly from the local display control in real time. At step 154 the display management system determines a class of the display on which the video content is to be viewed. At step 156 the display management system selects a class-specific version of the video content which is optimized for the determined class of display. At step 158 the display management system determines if the display on which the video content is to be displayed has any deviations from the general class of display which would warrant adjustment of the class-specific version. Determining deviations may comprise, for example, receiving individual parameters from the local display control in real time. If there are deviations from the class (step 158 YES output), method 150 proceeds to step 160 where the display management system determines individual adjustment data to provide to the display along with the class-specific version. In some embodiments, determining individual adjustment data may comprise using received display information to query a display characteristics database. After determining individual adjustment data at step 160, or if there are no deviations from the class (step 158 NO output), method 150 proceeds to step 162 where the display management system provides the class-specific version of the video content along with any individual adjustment data to the local display control. In some embodiments, where individual adjustment data is determined, the class-specific version is modified based on the individual adjustment data at step 162 and the display management system provides the modified class-specific version of the video content to the local display control. In some such embodiments, individual adjustment data is not sent to the local display control.

In some embodiments, the invention may be characterized as a display management unit configured to provide a modified video signal for display on a target display over an electronic distribution network. The unit may access information regarding the target display and at least one input (e.g., video signal). The unit comprises a database interface configured to retrieve display characteristics corresponding to the information regarding the target display from a characteristics database, and a mapping unit configured to map at least one of tone and color values from the at least one input to corresponding mapped values based at least in part on the retrieved display characteristics to produce the modified video signal. The display management may be configured to access ambient information characterizing ambient conditions at the target display, and the mapping unit configured to map the at least one of tone and color values from the at least one input video signal to corresponding mapped values based at least in part on the ambient information. Display management units may form part of a server-based display management system for providing video content to a plurality of displays. In addition to one or more display management units, the system includes a display characteristics database storing display characteristics for a plurality of different types of displays.

In one embodiment, the invention comprises a display management unit configured to provide a modified video signal for display on a target display over an electronic distribution network, the display management unit configured to access information regarding the target display and at least one input video signal, the display management unit comprising, a database interface configured to retrieve display characteristics corresponding to the information regarding the target display from a display characteristics database; and a mapping unit configured to map at least one of tone and color values from the at least one input video signal to corresponding mapped values based at least in part on the retrieved display characteristics to produce the modified video signal. The display management unit may also be configured to access metadata characterizing at least one aspect of a creative intent affecting how the video content embodied in the at least one input video signal ought to be displayed, wherein the mapping unit is configured to map the at least one of tone and color values from the input video signal to corresponding mapped values based at least in part on the metadata. In various embodiments, including those noted directly above, the metadata is contained in the at least one input video signal and the display management unit is configured to extract the metadata from the video signal.

The display management unit may be further configured to access ambient information characterizing ambient conditions at the target display, wherein the mapping unit is configured to map the at least one of tone and color values from the at least one input video signal to corresponding mapped values based at least in part on the ambient information.

The display management unit may be further configured such that the information regarding the target display comprises a display class identifier and wherein the database interface is configured to retrieve display class characteristics corresponding to the display class identifier from the display characteristics database, and wherein the mapping unit is configured to map the at least one of tone and color values from the at least one input video signal to corresponding mapped values based at least in part on the retrieved display class characteristics.

The display management unit may be yet further configured such that the information regarding the target display comprises information regarding at least one individual parameter regarding the target display, wherein the database interface is configured to retrieve adjustment information corresponding to the received at least one individual parameter from the display characteristics database, and wherein the mapping unit is configured to map the at least one of tone and color values from the input video signal to corresponding mapped values based at least in part on the retrieved adjustment information.

The display management unit may still yet further be configured such that at least one video input signal comprises a first input video signal optimized for a first display and a second input video signal optimized for a second display different from the first display, wherein the mapping unit is configured to generate mapped values by at least one of, interpolating the at least one of tone and color values from the first and second input video signals, extrapolating the at least one of tone and color values from the first and second input video signals, and passing without modification the at least one of tone and color values from a selected one of the first and second input video signals. The mapping unit may be configured to determine from at least one of the received information regarding the target display and the retrieved display characteristics whether a capability of the target display matches a capability of the displays for which the first and second input video signals were optimized, and, when the capability of the target display matches a capability of a matching one of the displays for which the first and second input video signals were optimized, to generate mapped values by passing without modification the at least one of tone and color values from the matching one of the first and second video signals.

The display management unit may be even further configured such that at least one input video signal comprises a legacy video version and a second video version of quality higher than the legacy video version, wherein the mapping unit is configured to generate mapped values by, when the retrieved display characteristics do not indicate a valid capability of the target display, passing without modification the at least one of tone and color values from the legacy video version, when the retrieved display characteristics indicate that the target display is capable of displaying the second video version, one of passing without modification the at least one of tone and color values from the second video version and extrapolating the at least one of tone and color values from the legacy video version and second video version, and when the retrieved display characteristics indicate that the target display is incapable of displaying the second video version, interpolating the at least one of tone and color values from the legacy video version and the second video version.

In other embodiments, which may include any number of the above features, the invention comprises a display management unit configured to provide a modified video signal for display on a target display over an electronic distribution network, the display management unit configured to access information regarding the target display and at least one input video signal, the display management unit comprising, a database interface configured to retrieve display characteristics corresponding to the information regarding the target display from a display characteristics database, and a mapping unit configured to map at least one of tone and color values from the at least one input video signal to corresponding mapped values based at least in part on the retrieved display characteristics to produce the modified video signal. The mapping unit may be configured to selectively map the at least one of tone and color values from the at least one input video signal to corresponding mapped values based at least in part on magnitudes of the at least one of tone and color values. Alternatively, for example, the mapping unit may be configured to selectively map the at least one of tone and color values from the at least one input video signal to corresponding mapped values based at least in part on locations of pixels corresponding to the at least one of tone and color values in image frames of the input video signal. In yet another example alternative the mapping unit may be configured to selectively map the at least one of tone and color values from the at least one input video signal to corresponding mapped values based at least in part on an assessment of whether mapping the values would likely result in an artefact visible to a human observer. In yet still another alternative, the mapping unit may be configured to map the at least one of tone and color values from the at least one input video signal to corresponding mapped values based at least in part on image content in the input video signal, and the mapping unit may also configured to any of: map tone values from the at least one input video signal to corresponding mapped values based on at least one corresponding color value, map the at least one of tone and color values from the at least one input video signal to corresponding mapped values based at least in part on a mean luminance of pixels in the output video signal over a period of time, map the at least one of tone and color values from the at least one input video signal to corresponding mapped values based at least in part on an estimated mean illumination provided by the target display in the display of the output video signal over a period of time, the estimated mean illumination based at least in part on luminance of pixels in the output video signal over a period of time and retrieved display characteristics, and map the at least one of tone and color values from the at least one input video signal to corresponding mapped values according to a mapping that varies over time.

Mapping that varies over time may be based, for example, at least in part on an estimated adaptation of the human visual system. Estimated adaptations of the human visual system may be derived from any of, for example, a model of adaptation of the human visual system, the model comprising a function of ambient information, ambient information based, at least in part, on a mean luminance of pixels in the output video signal over a period of time, and ambient information based, at least in part, on an estimated mean illumination provided by the target display in the display of the output video signal over a period of time, the estimated mean illumination based at least in part on luminance of pixels in the output video signal over a period of time and retrieved display characteristics.

In one embodiment, the present invention comprises a server-based display management system for providing video content to a plurality of displays, the system comprising, a display characteristics database storing display characteristics for a plurality of different types of displays, and, one or more display management units, each display management unit configured to provide a modified video signal for display on a target display over an electronic distribution network, each display management unit configured to access information regarding the target display and at least one input video signal and comprising, a database interface configured to retrieve display characteristics corresponding to the information regarding the target display from the display characteristics database, and, a mapping unit configured to map tone and/or color values from the at least one input video signal to corresponding mapped values based on the retrieved display characteristics to produce the modified video signal for the target display. The mapping unit may include any of the features described elsewhere herein to provide an appropriate mapping based on any aspect of the invention.

In one embodiment, the invention comprises a transcoder configured to receive an encoded input video signal and provide an encoded modified video signal, the transcoder comprising, a decoder configured to decode the encoded input video signal and produce a decoded input video signal, a display management unit configured to receive the decoded input video signal and configured to map tone and/or color values from the input video signal to corresponding mapped values to produce a modified video signal, and, an encoder configured to receive the modified video signal and encode the modified video signal.

In one embodiment, the present invention comprises a method in display management unit for producing a modified video signal for display on a target display, the method comprising, accessing an input video signal, accessing information regarding the target display, retrieving display characteristics corresponding to the information regarding the target display from a display characteristics database, mapping at least one of tone and color values from the input video signal to corresponding mapped values based at least in part on the retrieved display characteristics to produce the modified video signal, and, providing the modified video signal to the target display over an electronic distribution network.

In one embodiment, the present invention comprises a display management unit configured to provide a modified video signal for display on a target display over an electronic distribution network, the display management unit configured to receive at least one input video signal and metadata characterizing at least one aspect of a creative intent affecting how the video content embodied in the at least one input video signal ought to be displayed, and comprising, a mapping unit configured to map at least one of tone and color values from the at least one input video signal to corresponding mapped values based at least in part on the metadata, and, a video output connectable to provide the modified video signal to the target display over an electronic distribution network. The metadata may be contained, for example, in the at least one input video signal.

In one embodiment, the present invention comprises a display management unit configured to provide a modified video signal for display on a target display over an electronic distribution network, the display management unit configured to access at least one input video signal and information regarding the target display, the information regarding the target display comprising a display class identifier identifying a display class of the target display, the display management unit comprising, a content version generator configured to generate a plurality of versions of video content from the at least one input video signal, each version configured to be provided to one of a plurality of different classes of display, and a content version selector configured to select a selected version of the plurality of versions of video content based on the display class identifier, wherein the display management unit is configured to generate the modified video signal based on the selected version. The display management unit may further comprise a database interface configured to retrieve display class characteristics corresponding to each of the plurality of different classes of display from a display characteristics database, wherein the content generator comprises a mapping unit configured to map at least one of tone and color values from the at least one input video signal to corresponding version-specific mapped values based at least in part on the retrieved display class characteristics. The at least one video input signal may comprise, for example, a first input video signal optimized for a first display class and a second input video signal optimized for a second display class different from the first display class, wherein the mapping unit is configured to generate version-specific mapped values by at least one of, interpolating the at least one of tone and color values from the first and second input video signals, extrapolating the at least one of tone and color values from the first and second input video signals, and passing without modification the at least one of tone and color values from a selected one of the first and second input video signals. The information regarding the target display may comprise information regarding at least one individual parameter regarding the target display, wherein the database interface is configured to retrieve display characteristics corresponding to the at least one individual parameter, and comprise a content optimizer configured to generate individual adjustment data based on the retrieved display characteristics and to map at least one of tone and color values from the selected version to corresponding mapped values based at least in part on the individual adjustment data. The information regarding the target display may comprise information regarding at least one individual parameter regarding the target display, wherein the database interface is configured to retrieve display characteristics corresponding to the at least one individual parameter, and comprise a content optimizer configured to generate individual adjustment data based on the retrieved display characteristics, and the display management unit configured to combine the selected version and the at least one of the at least one individual parameter to conform to a standard video format.

While a number of exemplary aspects and embodiments have been discussed above, those of skill in the art will recognize certain modifications, permutations, additions and sub-combinations thereof. This disclosure is intended to be interpreted to encompass all such modifications, permutations, additions and sub-combinations as are within its true spirit and scope.

What is claimed:

1. A display management unit for a plurality of target displays comprising:
the display management unit receiving: a first and a second source video data and associated metadata, wherein the first and the second source video data are two different versions of a same video content that are graded by a content provider according to dynamic range and color gamut to comprise a first and a second range of video parameters;
a video mapping unit, the video mapping unit mapping the first and the second source video data and associated metadata to be displayed upon the plurality of target displays to preserve the creative intent of the content provider; and
wherein the video mapping unit is configured to derive a modified video signal from the first and the second source video data by one of a group of interpolations of the first and the second source video data to be rendered on a desired target display if the first and second source range of video parameters are not optimized to preserve a desired creative color grading for the desired target display; and
further wherein one said interpolation is performed as follows:

$$Y_{MDR}=e^{(\alpha*log(Y_{LDR})+\beta*log(Y_{VDR}))}$$

$$X_{MDR}=\alpha*X_{LDR}+\beta*X_{VDR}$$

$$Y_{MDR}=\alpha*Y_{LDR}+\beta*Y_{VDR}$$

where Y is a luminance coordinate, VDR is associated with data of displays of higher capability, LDR is associated with data of displays having lower capability and MDR is associated with data for a target display, $\alpha$ is associated with a logarithmic function of the target display capability and $\beta=1-\alpha$.

2. The display management unit of claim 1, wherein further the video mapping unit outputs enhanced video information, the enhanced video information comprising one of high spatial frequency information, enhanced dynamic range information.

3. The display management unit of claim 2, wherein further the video mapping unit outputs metadata relating to the modified video content.

4. The display management unit of claim 1, wherein further the modified video signal is a function of the maximum and minimum brightness, color gamut, and other characteristics of the target display.

5. The display management unit of claim 1, wherein the display management unit further comprises an extractor, the extractor extracts attributes of the source video data for translation of the attributes for the modified video data.

6. The display management unit of claim 5, wherein one of the attributes extracted from the source video data comprises color space data of the source video data.

7. The display management unit of claim 1, wherein the metadata that accompanies the source video data carries information about the content grading system used to grade the content.

8. The display management unit of claim 1, wherein further the display management unit employs the metadata to transforms source video data to produce an optimized output for display on the target device.

9. A method for image processing on a display management unit for a plurality of target displays, comprising:
receiving a first and a second source video data and associated metadata, wherein the first and the second source video data are graded by a content provider according to dynamic range and color gamut to comprise a first and a second range of video parameters;
receiving data regarding the plurality of target displays, comprising each target display characteristics;
mapping the first and the second source video data and associated metadata of the first range of video parameters to be displayed upon a desired target display to preserve the creative intent of the content provider; and
wherein mapping the source video data further comprises deriving a modified video signal from the first and the second source video data by one of a group of interpolations of the first and the second source video data to be rendered on the desired target display if the first and second source range of video parameters are not optimized to preserve a desired creative color grading for the desired target display; and
further wherein one said interpolation is performed as follows:

$$Y_{MDR}=e^{(\alpha*log(Y_{LDR})+\beta*log(Y_{VDR}))}$$

$$X_{MDR}=\alpha*X_{LDR}+\beta*X_{VDR}$$

$$Y_{MDR}=\alpha*Y_{LDR}+\beta*Y_{VDR}$$

where Y is a luminance coordinate, VDR is associated with data of displays of higher capability, LDR is associated with data of displays having lower capability and MDR is associated with data for a target display, $\alpha$ is associated with a logarithmic function of the target display capability and $\beta=1-\alpha$.

10. The method of claim 9, wherein deriving a modified video signal further comprises deriving modified video signal as a function of the maximum and minimum brightness, color gamut, and other characteristics of the target display.

11. The method of claim 9, further comprising extracting attributes of the source video data for translation of the attributes for the modified video data.

12. The method of claim 11, wherein further one of the attributes extracted from the source video data comprises color space data of the source video data.

13. The method of claim 9, wherein further the metadata that accompanies the source video data carries information about the content grading system used to grade the content.

14. The method of claim 9, further comprising employing the metadata to transforms source video data to produce an optimized output for display on the target device.

\* \* \* \* \*